(12) United States Patent
Joshi et al.

(10) Patent No.: US 7,655,202 B2
(45) Date of Patent: Feb. 2, 2010

(54) COAL FIRED FLUE GAS TREATMENT AND PROCESS

(75) Inventors: Ashok V. Joshi, Salt Lake City, UT (US); Chett Boxley, Park City, UT (US)

(73) Assignee: Ceramatec, Inc., Salt Lake City, UT (US)

( * ) Notice: Subject to any disclaimer, the term of this patent is extended or adjusted under 35 U.S.C. 154(b) by 110 days.

(21) Appl. No.: 11/869,122

(22) Filed: Oct. 9, 2007

(65) Prior Publication Data
US 2009/0090277 A1 Apr. 9, 2009

(51) Int. Cl.
*B01D 47/00* (2006.01)
*B01D 53/50* (2006.01)
*B01D 53/56* (2006.01)
*B01D 53/62* (2006.01)

(52) U.S. Cl. .................. 423/210; 423/225; 423/235; 423/243.01; 423/243.08; 423/215.5; 106/705; 106/DIG. 1

(58) Field of Classification Search ............... 423/210, 423/225, 235, 243.01, 243.08, 215.5; 106/705, 106/DIG. 1
See application file for complete search history.

(56) References Cited

U.S. PATENT DOCUMENTS

| | | | |
|---|---|---|---|
| 1,290,244 A * | 1/1919 | Kramers | ............... 423/225 |
| 3,773,472 A * | 11/1973 | Hausberg et al. | ............ 422/169 |
| 4,210,457 A | 7/1980 | Dodson et al. | |
| 4,842,649 A | 6/1989 | Heitzmann et al. | |
| 5,601,643 A | 2/1997 | Silverstrim et al. | |
| 5,820,668 A | 10/1998 | Comrie et al. | |
| 5,968,254 A | 10/1999 | Dodgen et al. | |
| 5,997,632 A | 12/1999 | Styron et al. | |
| 6,204,430 B1 | 3/2001 | Baldwin et al. | |
| 6,264,740 B1 * | 7/2001 | McNulty, Jr. | ............... 106/817 |
| 6,482,258 B2 | 11/2002 | Styron et al. | |
| 6,802,898 B1 | 10/2004 | Liskowitz et al. | |
| 6,869,473 B2 | 3/2005 | Comrie | |
| 7,141,112 B2 | 11/2006 | Comrie et al. | |
| 2007/0221100 A1* | 9/2007 | Kumar et al. | ............... 106/707 |
| 2009/0013907 A1* | 1/2009 | Boxley et al. | ............... 106/705 |
| 2009/0071379 A1* | 3/2009 | Boxley | ..................... 106/705 |

OTHER PUBLICATIONS

Gao, Yu-Ming et al., "Effects of Carbon on Air Entrainment in Fly Ash Concrete: The Role of Soot and Carbon Black", *Energy & Fuels*, 11,(1997),457-462.

* cited by examiner

*Primary Examiner*—Timothy C Vanoy
(74) *Attorney, Agent, or Firm*—David Fonda

(57) ABSTRACT

A process for treating flue gas containing fly ash and carbon dioxide is disclosed. In the process, carbon dioxide and fly ash are contacted with an aqueous metal hydroxide solution to convert carbon dioxide into a metal carbonate, and wherein the metal carbonate and the metal hydroxide cause the fly ash to undergo a geopolymerization reaction and form a geopolymerized fly ash. The geopolymerized fly ash is recovered for disposal or for further use, such as a concrete additive.

25 Claims, 4 Drawing Sheets

COAL FIRED FLUE GAS TREATMENT AND PROCESS

BACKGROUND OF THE INVENTION

This invention relates to a process for treating flue gas that contains fly ash and carbon dioxide ($CO_2$). The flue gas may contain nitrogen oxides (NOx), sulfur oxides (SOx), and other compounds and pollutants commonly present in flue gas produced by combustion of pulverized coal or other fossil fuels. The treatment process captures the flue gas components into a solid form.

Fly ash is the finely divided mineral residue resulting from the combustion of pulverized coal in coal-fired power plants. Fly ash consists of inorganic, incombustible matter present in the coal or fuel that has been fused during combustion into a glassy, amorphous structure. Fly ash material is solidified while suspended in the exhaust gases and is collected by electrostatic precipitators or filter bags. They consist mostly of silicon dioxide ($SiO_2$), aluminum oxide ($Al_2O_3$) and iron oxide ($Fe_2O_3$), and are hence a suitable source of aluminum and silicon for geopolymers. They are also pozzolanic in nature and react with calcium hydroxide and alkali to form cementitious compounds.

Carbon dioxide is a principal reaction product in coal combustion. It is also a "greenhouse gas" believed to contribute to global climate change. Many researchers are seeking means to reduce greenhouse gas emissions by capturing carbon dioxide from large stationary sources, such as power plants.

It is known to remove nitrogen oxides and sulfur oxides from gaseous effluent by an aqueous, alkaline scrubber. The scrubbing solutions may have a high pH, from 7 to 14, and typically from 10 to 14. Slaked lime ($Ca(OH)_2$) is one known example of a scrubbing solution. Dry sorbents and catalytic processes are also known and used to remove nitrogen and sulfur oxides from flue gas.

It would be an advancement in the art to provide a process for treating flue gas that contains fly ash and carbon dioxide such that the flue gas components are captured into a solid form. It would be a further advancement in the art to provide a process that captures carbon dioxide in flue gas to prevent it from contributing to environmental greenhouse gases. It would be yet another advancement in the art to provide a process for treating flue gas that converts fly ash into a usable concrete additive. Such processes are provided herein.

BRIEF SUMMARY OF THE INVENTION

The invention is drawn to a process of treating flue gas containing fly ash and carbon dioxide to capture the flue gas components into a solid form. The carbon dioxide and fly ash are contacted with an aqueous metal hydroxide solution. This may occur within a suitable reactor vessel that permits effective contacting of the gaseous and particulate components of the flue gas with the metal hydroxide solution. The carbon dioxide reacts with the metal hydroxide to form a metal carbonate. The metal carbonate and/or metal hydroxide act as an activator solution to react with the fly ash to initiate a geopolymerization reaction and form a geopolymerized fly ash. The geopolymerized fly ash may be recovered. The disclosure of copending U.S. patent application Ser. No. 11/776,892 entitled "Treatment of Fly Ash for Use in Concrete," filed Jul. 12, 2007, is incorporated by reference.

Many existing coal-fired power plants contain systems and apparatus for removing fly ash, nitrogen oxides (NOx), sulfur oxides (SOx), and other compounds and pollutants. The present invention may be used in combination with such systems. For example, fly ash may be separated from the flue gas, the nitrogen oxides and sulfur oxides may be treated and removed from the flue gas, the remaining flue gas containing carbon dioxide and other trace elements may be contacted with a metal hydroxide solution to form a metal carbonate, and the reaction product combined with fly ash to initiate a geopolymerization reaction.

It is within the scope of the invention to include the steps of contacting nitrogen oxides (NOx) with the aqueous metal hydroxide solution to convert the NOx into a metal nitrate and mixing the fly ash and the metal nitrate. It is within the scope of the invention to include the step of contacting sulfur oxides (SOx) with the aqueous metal hydroxide solution to convert the SOx into a metal sulfite and mixing the fly ash and the metal sulfite. The nitrogen oxides and sulfur oxides may be treated separately or together with the carbon dioxide. The resulting carbonate, nitrite, nitrate, sulfite, and sulfate compounds may be used to activate fly ash geopolymerization reactions.

The metal hydroxide may be an alkali metal hydroxide, such as, but not limited to, LiOH, NaOH, KOH, and mixtures thereof. The metal hydroxide may be an alkaline earth metal hydroxide such as, but not limited to, $Mg(OH)_2$, $Ca(OH)_2$, and mixtures thereof. The metal hydroxide may include mixtures of alkali and alkaline earth metal hydroxides. One low-cost source of metal hydroxide is slaked lime ($Ca(OH)_2$). Slaked lime is obtained when calcium oxide (called lime or quicklime) is slaked with water.

In some embodiments, the geopolymerized fly ash may be dried to facilitate its recovery. In other embodiments, the geopolymerized fly ash may be granulated. Various techniques may be used to granulate the geopolymerized fly ash, including, but not limited to, spray drying, crushing, grinding, or other similar techniques. During drying, the geopolymerized fly ash may be heated to a temperature between 20 and 1000° C. to help dry the geopolymerized fly ash. In some embodiments, the geopolymerized fly ash may be heated to a temperature between 20 and 150° C. The granulated, geopolymerized fly ash will typically have a mean particle size between 0.1 and 1000 microns. In some embodiments, the geopolymerized fly ash will have a mean particle size between 10 and 100 microns.

This invention includes a process for treating flue gas containing fly ash, including high-carbon fly ash, and carbon dioxide to render it highly usable as a concrete additive. The recovered, geopolymerized fly ash may be used as a concrete additive. Thus, the invention also includes treated flue gas and concrete mixtures containing the treated flue gas. As used herein, the term concrete refers to a material made by mixing a cementing material, such as Portland cement, an aggregate, such as sand and/or gravel, and sufficient water to cause the cement to set and bind the mixture. Some fly ashes containing lime are considered to be "cementitious" in nature. A geopolymerized fly ash if allowed to cure and set may be considered a cement as well. Under the foregoing definition, mortar, which comprises a cementing material, sand, and water, may be considered a type of concrete.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment, but may refer to every embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE SEVERAL VIEWS OF THE DRAWINGS

In order that the manner in which the above-recited and other features and advantages of the invention are obtained will be readily understood, a more particular description of the invention briefly described above will be rendered by reference to specific embodiments thereof that are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of metal hydroxide solutions, flue gas systems, process variations, etc., to provide a thorough understanding of embodiments of the invention. One having ordinary skill in the relevant art will recognize, however, that the invention may be practiced without one or more of the specific details or method steps, or with other methods, components, materials, and so forth. In other instances, well-known structures, materials, or operations are not shown or described in detail to avoid obscuring aspects of the invention.

Disclosed herein is a process for treating flue gas containing fly ash, carbon dioxide, and optionally other fossil fuel combustion products. The treatment process renders the fly ash highly usable as a concrete additive. The invention is also useful for converting fly ash that is considered unusable for concrete into fly ash that is a useful concrete additive. Such unusable fly ash typically contains carbon and often activated carbon of the type used in coal fired power plants for pollution control.

Figure 1:
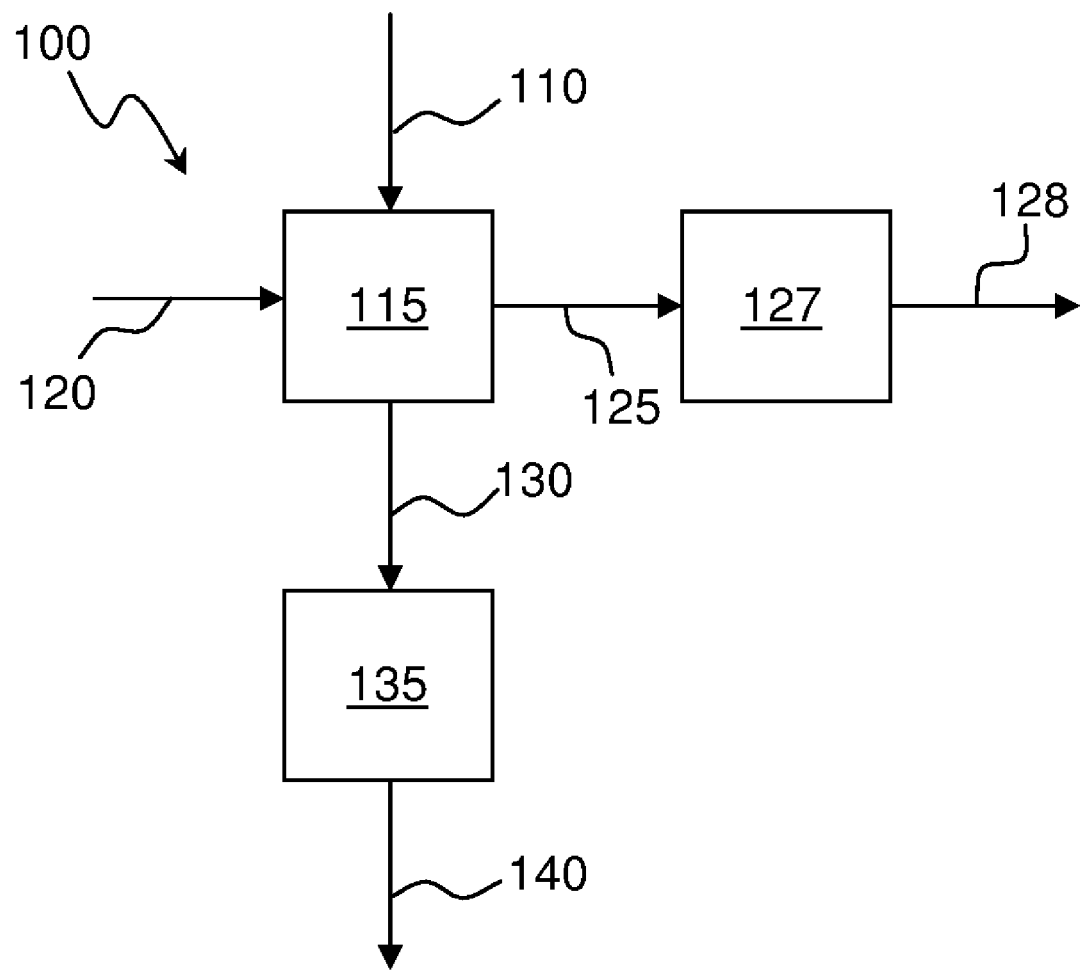
FIG. 1 is a schematic flow chart of a representative embodiment of one process of treating flue gas containing fly ash and carbon dioxide.

Referring to FIG. 1, a process 100 for treating flue gas is shown in a schematic flow chart. Flue gas 110 containing fly ash and carbon dioxide is introduced into a reactor 115. The flue gas 110 may or may not represent the entire combustion effluent from a coal fired power plant. A supply of metal hydroxide solution 120 is introduced into the reactor 115. The reactor 115 is preferably engineered to permit effective contacting of the gaseous and particulate components of the flue gas 110 with the metal hydroxide solution 120. Suitable reactors are known in the art relating to existing flue gas processing equipment. In addition to carbon dioxide and fly ash, the flue gas may contain other components such as nitrogen oxides, sulfur oxides, heavy metals, and pollutant compounds. These other components may be removed from the flue gas using existing equipment and processes or they may be treated together with the carbon dioxide and fly ash.

FIG. 1 illustrates a process in which the flue gas components are contacted with a metal hydroxide solution 120. The following are non-limiting examples of typical chemical reactions that may occur when the flue gas is contacted with aqueous metal hydroxide:

$$2M^{I}OH + CO_2 \leftrightarrow M^{I}_2CO_3 + H_2O \quad (1)$$

$$2M^{I}OH + SO_2 \leftrightarrow M^{I}_2SO_3 + H_2O \quad (2)$$

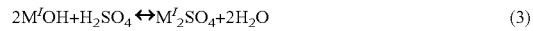
$$2M^{I}OH + H_2SO_4 \leftrightarrow M^{I}_2SO_4 + 2H_2O \quad (3)$$

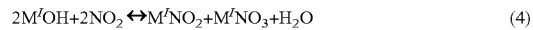
$$2M^{I}OH + 2NO_2 \leftrightarrow M^{I}NO_2 + M^{I}NO_3 + H_2O \quad (4)$$

Where $M^{I}$ is a mono-valent metal, such as an alkali metal.

$$M^{II}(OH)_2 + CO_2 \leftrightarrow M^{II}CO_3 + H_2O \quad (5)$$

$$M^{II}(OH)_2 + SO_2 \leftrightarrow M^{II}SO_3 + H_2O \quad (6)$$

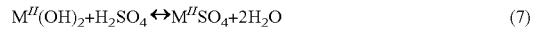
$$M^{II}(OH)_2 + H_2SO_4 \leftrightarrow M^{II}SO_4 + 2H_2O \quad (7)$$

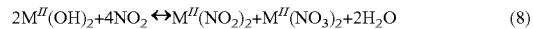
$$2M^{II}(OH)_2 + 4NO_2 \leftrightarrow M^{II}(NO_2)_2 + M^{II}(NO_3)_2 + 2H_2O \quad (8)$$

Where $M^{II}$ is a di-valent metal, such as an alkaline earth metal.

The foregoing carbonate, sulfite, sulfate, nitrite, and nitrate reaction products, alone or in combination with additional metal hydroxide solution, may be used to activate fly ash geopolymerization reactions. The presence of NOx, SOx, or $CO_2$ reaction products does not affect the geopolymerization of the fly ash. On a molecular level, the geopolymerization of fly ash is similar to polymer chains cross linking to form larger and larger polymers. This involves forming an aluminosilicate network during the curing of the geopolymerized fly ash.

Non-limiting examples of metal hydroxide solutions include alkali metal hydroxides, alkaline earth metal hydroxides, and mixtures thereof. For example, the metal hydroxide solution may include, but is not limited to, aqueous solutions of LiOH, NaOH, KOH, $Mg(OH)_2$, $Ca(OH)_2$, and mixtures thereof. One low-cost source of metal hydroxide is slaked lime ($Ca(OH)_2$). Slaked lime is obtained when calcium oxide (called lime or quicklime) is slaked with water. Sodium hydroxide NaOH is another non-limiting example of a low-cost source of metal hydroxide.

The reactor 115 may provide a mixing function. The geopolymerized fly ash can have a large range of viscosity during mixing (i.e. metal hydroxide solution+calcium carbonate (and optionally other flue gas reaction products)+untreated fly ash). The viscosity gradually increases as a function of time; however, different activators introduce different rates of reaction. It was observed that using more water renders the mixture less viscous and makes the mixture more pourable, but it tends to retard setting time. The mixture will not set up while it is being mixed or agitated. Thus, continued mixing will delay setting and permit continued working of the mixture. However, once mixing stops, the geopolymerized fly ash will set. In some cases it may be desirable to add chemical agents to delay or retard setting. Examples of retardants include, without limitation, borax and borate compounds. Retardants may be desirable or even necessary when the geopolymerized fly ash is granulated and dried.

After the flue gas components have reacted with the metal hydroxide solution 120, clean gas 125 is discharged from the reactor 115. Clean gas 125 contains principally oxygen, nitrogen, and water vapor. As used herein, the term "clean gas" means that the major combustion products are removed from the flue gas. Thus, clean gas 125 contains little or no carbon dioxide, nitrogen oxides, sulfur oxides, and pollutant compounds. However, clean gas 125 may contain trace pollutants and other elements and compounds. Depending upon the volume of clean gas being discharged, it may be heated to facilitate discharge into the atmosphere. For example, a post-process heater 127 may optionally heat the clean gas. Waste heat from the combustion process may conveniently be used by the post-process heater 127. Heated clean gas 128 is discharged.

A slurry of geopolymerized fly ash 130 is transported to a collector 135 where solid product 140 is recovered. The collector 135 may include, but is not limited to a drier. The flue gas treatment process within the scope of the present invention may be associated with coal-, or other fossil fuel-, fired power plants. In such cases, there may be unused or waste heat available to help dry the geopolymerized fly ash.

The geopolymerized fly ash may be granulated so it may be more easily used as an additive in concrete mixtures. Various techniques may be used to granulate the geopolymerized fly ash, including, but not limited to, spray drying, drum drying, belt drying, crushing, grinding, or other similar techniques. The geopolymer mix may be allowed to fully set and cure. It may then be crushed back into a powder using a mortar and pestle, a hammer mill or other crushing device. The crushed powder can be sieved to a desired size. Crushing and sieving are optional steps in the process.

Typical fly ash produced during combustion of pulverized coal may contain one or more unwanted metals or heavy metals, such as, but not limited to, Hg, As, Fe, Mn, Zn, Cr, Co, Pb, Cu, V, and Mg. The metals may typically be present in the ppm (parts per million) concentration, but may be present at high concentration, in the ppt (parts per thousand) level. Another benefit of the geopolymerized fly ash is that unwanted metals or heavy metals are entrapped within the geopolymerized fly ash to inhibit leaching into the environment.

Figure 2:
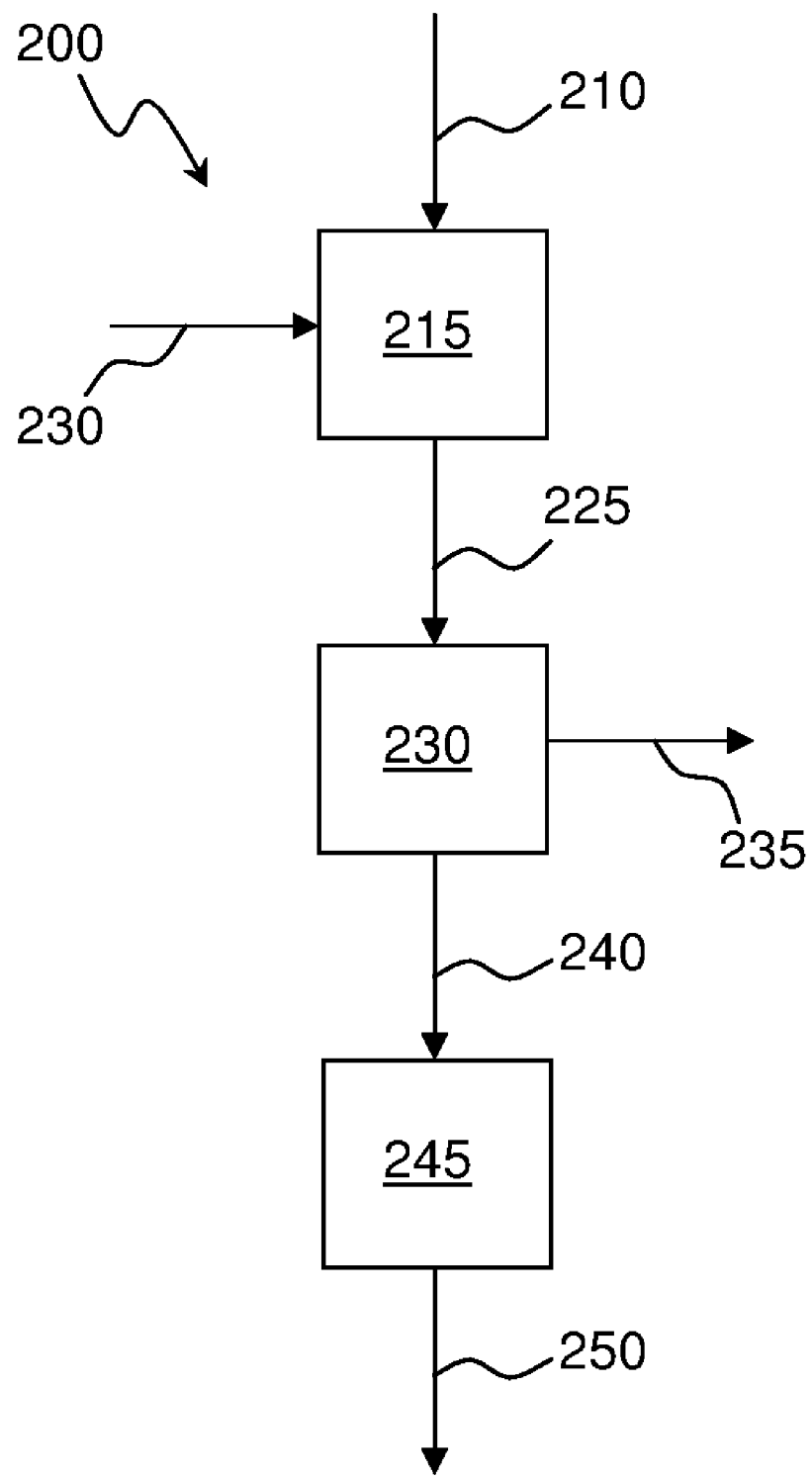
FIG. 2 is a schematic flow chart of another embodiment of a process of treating flue gas containing fly ash and carbon dioxide.

The reactor 115 may consist of one or multiple reactor vessels that perform the same or different steps in the process of contacting and reacting the flue gas with a metal hydroxide solution. For example, FIG. 2 illustrates a schematic flow chart of a process 200 of treating flue gas 210 similar to process 100 in which the flue gas 210 is introduced into a contactor 215 and metal hydroxide solution 220 is also introduced into contactor 215. The mixture 225 of flue gas, metal hydroxide solution, and reaction products is transported to a reactor 230 in which further reaction and geopolymerization of fly ash may occur. Clean gas 235, containing oxygen, nitrogen, and water vapor, may be discharged from reactor 230. If necessary, clean gas 235 may be heated prior to discharge. A slurry of geopolymerized fly ash 240 is transported to a collector 245 where solid product 250 is recovered. In the embodiment illustrated in FIG. 2, the contactor 215 and the reactor 230 perform the function of reactor 125 illustrated in FIG. 1.

Many coal-fired, or other fossil fuel-fired, power plants have existing apparatus and processes to remove fly ash. Non-limiting example so traditional fly ash removal systems include an electrostatic precipitator or a baghouse. Also many power plants have existing apparatus and processing for treating and removing sulfur and nitrogen oxides. For example, the plant may use a wet or dry flue gas desulfurization (FGD) system to remove sulfur oxides, mainly sulfur dioxide ($SO_2$), from the exhaust flue gases. The FGD process may include wet scrubbing using a slurry of sorbent, such as a metal hydroxide solution, to scrub the gases; spray-dry scrubbing using similar sorbent slurries; or dry sorbent injection systems. A selective catalytic reduction (SCR) system also may be used to remove nitrogen oxides through a chemical reaction between the exhaust gases, a reductant additive, and a catalyst. A gaseous or liquid reductant (most commonly ammonia or urea) is added to a stream of flue or exhaust gas and is absorbed onto a catalyst. The reductant reacts with NOx in the flue gas to form harmless water vapor and nitrogen gas.

It is within the scope of the present invention to use existing plant pollution controls to remove the various flue gas pollutants, such as SOx and NOx discussed above, and the "left-over" pollutants or unremoved SOx and NOx can be directed to react with the metal hydroxide solution to form one or more products listed above in equations (1)-(8). From there this slurry of products can then be reacted with the collected fly ash to form geopolymerized fly ash for safe disposal or use in concrete applications.

Figure 3:
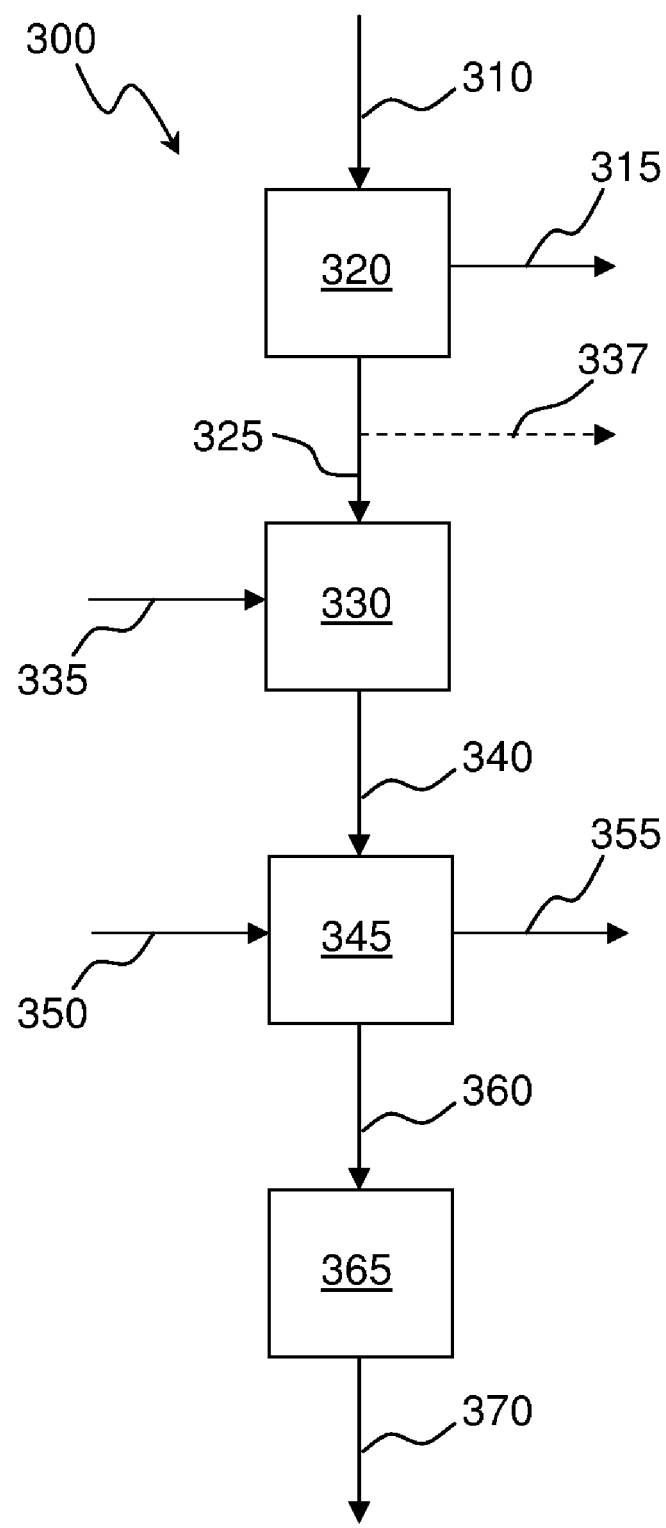
FIG. 3 is a schematic flow chart of another embodiment of a process of treating flue gas containing fly ash and carbon dioxide.

FIG. 3 illustrates a schematic flow chart of a process 300 of treating flue gas 310 similar to process 200 in which fly ash 315 is removed from the flue gas using a fly ash removal system 320. The fly ash removal system 320 may be an electrostatic precipitator, a baghouse, or other known or novel system for separating fly ash from flue gas. At least a part of the remaining flue gas 325 is introduced into a contactor 330 and metal hydroxide solution 335 is also introduced into contactor 330. It is estimated that about 1 to 5% of the total carbon dioxide generated during coal combustion may be reacted with the fly ash produced during combustion. Because not all of the flue gas carbon dioxide may be required for reaction with the fly ash, a portion of the flue gas 337 may be optionally removed for further processing or discharge. The mixture 340 of the at least a part of the remaining flue gas, metal hydroxide solution, and reaction products is transported to a reactor 345 where previously removed fly ash 350 is added and where geopolymerization of fly ash may occur. Clean gas 355, containing oxygen, nitrogen, and water vapor, may be discharged from reactor 345. If necessary, clean gas 355 may be heated prior to discharge. A slurry of geopolymerized fly ash 360 is transported to a collector 365 where solid product 370 is recovered.

Figure 4:
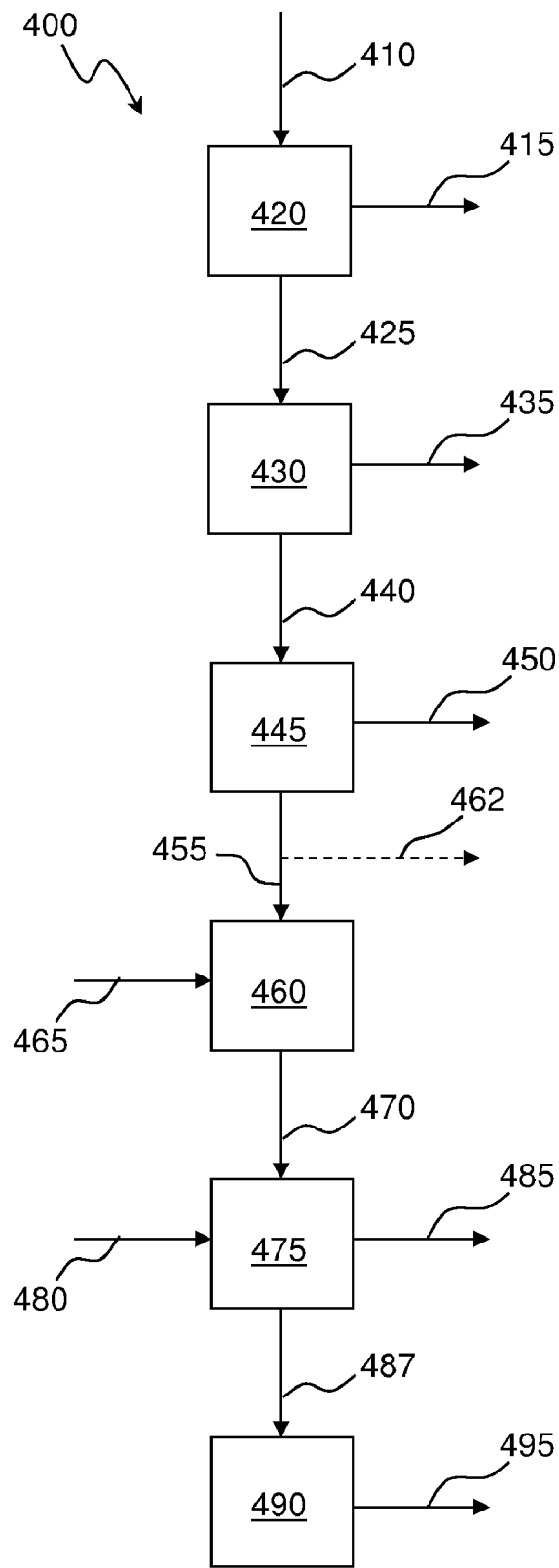
FIG. 4 is a schematic flow chart of a representative embodiment of a process of treating flue gas containing fly ash, carbon dioxide, nitrogen oxides, and sulfur oxides.

FIG. 4 illustrates a schematic flow chart of a process 400 of treating flue gas 410 similar to process 300. The flue gas 410 is introduced into a NOx contactor 420. The NOx contactor 420 may be, but is not limited to, a selective catalytic reduction (SCR) system. The NOx reaction products 415 are removed from NOx contactor 420. The remaining flue gas 425 is introduced into a fly ash removal system 430 in which fly ash 435 is removed from the flue gas. The remaining flue gas 440 is introduced into a SOx contactor 445. The SOx contactor 445 may be, but is not limited to, a wet or dry flue gas desulfurization system. SOx reaction products 450 are removed from SOx contactor 445. At least a part of the remaining flue gas 455 is introduced into contactor 460. Some of the flue gas 462 may be further processed or discharged according to conventional flue gas processing techniques. A metal hydroxide solution 465 is also introduced into contactor 460. The mixture 470 of the at least a port of the remaining flue gas, metal hydroxide solution, and reaction products is transported to a reactor 475 where previously removed fly ash 480 is added and where geopolymerization of fly ash may occur. Clean gas 485, containing oxygen, nitrogen, and water vapor, may be discharged from reactor 475. Depending upon the volume of clean gas being discharged, it may be heated to facilitate discharge into the atmosphere. For example, a post-process heater utilizing waste heat from the combustion processes may be optionally used. A slurry of geopolymerized fly ash 487 is transported to a collector 490 where solid product 495 is recovered.

It will be appreciated that a process for treating flue gas that contains fly ash and carbon dioxide is disclosed such that the flue gas components are captured into a solid form. The disclosed process captures carbon dioxide in flue gas to prevent it from contributing to environmental greenhouse gases. The disclosed process for treating flue gas converts fly ash into a usable concrete additive.

While specific embodiments of the present invention have been illustrated and described, numerous modifications come to mind without significantly departing from the spirit of the invention, and the scope of protection is only limited by the scope of the accompanying claims.

The invention claimed is:

1. A process of treating flue gas containing fly ash and carbon dioxide comprising:
   contacting the carbon dioxide and the fly ash with an aqueous metal hydroxide solution to convert carbon dioxide into a metal carbonate, and wherein the metal carbonate and the metal hydroxide cause the fly ash to undergo a geopolymerization reaction and form a geopolymerized fly ash; and
   recovering the geopolymerized fly ash.

2. The process according to claim 1, further comprising drying the geopolymerized fly ash.

3. The process according to claim 2, wherein the geopolymerized fly ash is dried by a dryer selected from a spray dryer, a drum dryer, a belt dryer, and combinations thereof.

4. The process according to claim 1, further comprising granulating the geopolymerized fly ash.

5. The process according to claim 3, wherein the geopolymerized fly ash is granulated by spray drying.

6. The process according to claim 3, wherein the geopolymerized fly ash is granulated by crushing.

7. The process according to claim 3, wherein the geopolymerized fly ash is a concrete additive.

8. The process according to claim 1, wherein the recovered geopolymerized fly ash is directly cast into a mold.

9. The process according to claim 1, wherein the recovered geopolymerized fly ash is directly added to a concrete mixture comprising Portland cement and aggregate.

10. The process according to claim 1, further comprising separating the fly ash from the flue gas and adding fly ash to the metal carbonate.

11. The process according to claim 1, wherein the flue gas further comprises oxides of nitrogen (NOx), and the process further comprises the step of:
    contacting the NOx with the aqueous metal hydroxide solution to convert the NOx into a metal nitrite or a metal nitrate; and
    mixing the fly ash with the metal nitrite or metal nitrate.

12. The process according to claim 1, wherein the flue gas further comprises oxides of sulfur (SOx), and the process further comprises the step of:
    contacting the SOx with the aqueous metal hydroxide solution to convert the SOx into a metal sulfite or a metal sulfate; and
    mixing the fly ash with the metal sulfite or metal sulfate.

13. The process according to claim 1, wherein the metal hydroxide comprises an alkali metal hydroxide.

14. The process according to claim 1, wherein the metal hydroxide comprises an alkaline earth metal hydroxide.

15. The process according to claim 1, wherein the metal hydroxide comprises slaked lime.

16. A process of treating flue gas containing fly ash, carbon dioxide, NOx, and SOx comprising:
    separating the fly ash from the flue gas;
    contacting the carbon dioxide, NOx, and SOx with an aqueous metal hydroxide solution to convert carbon dioxide into a metal carbonate, to convert the NOx to a metal nitrite or a metal nitrate, and to convert the SOx to a metal sulfite or metal sulfate; and
    mixing the fly ash with the aqueous metal hydroxide solution and the metal carbonate, metal nitrite or metal nitrate, and metal sulfite or metal sulfate, to initiate a geopolymerization reaction and form a geopolymerized fly ash.

17. The process according to claim 16, further comprising recovering the geopolymerized fly ash.

18. The process according to claim 16, further comprising drying the geopolymerized fly ash.

19. The process according to claim 16, further comprising granulating the geopolymerized fly ash.

20. The process according to claim 16, wherein the aqueous metal hydroxide solution comprises an alkali metal hydroxide, an alkaline earth metal hydroxide, or mixtures thereof.

21. A process of treating flue gas containing fly ash, carbon dioxide, NOx, and SOx comprising:
    separating the fly ash from the flue gas;
    contacting the NOx with an aqueous metal hydroxide solution to convert the NOx to a metal nitrite or a metal nitrate;
    contacting the SOx with an aqueous metal hydroxide solution to convert the SOx to a metal sulfite or metal sulfate;
    contacting the carbon dioxide with an aqueous metal hydroxide solution to convert carbon dioxide into a metal carbonate; and
    mixing the fly ash with the aqueous metal hydroxide solution and the metal carbonate, metal nitrite or metal nitrate, and metal sulfite or metal sulfate, to initiate a geopolymerization reaction and form a geopolymerized fly ash.

22. The process according to claim 21, further comprising recovering the geopolymerized fly ash.

23. The process according to claim 22, further comprising drying the geopolymerized fly ash.

24. The process according to claim 22, further comprising granulating the geopolymerized fly ash.

25. The process according to claim 21, wherein the aqueous metal hydroxide solution comprises an alkali metal hydroxide, an alkaline earth metal hydroxide, or mixtures thereof.

* * * * *